Figure 4:
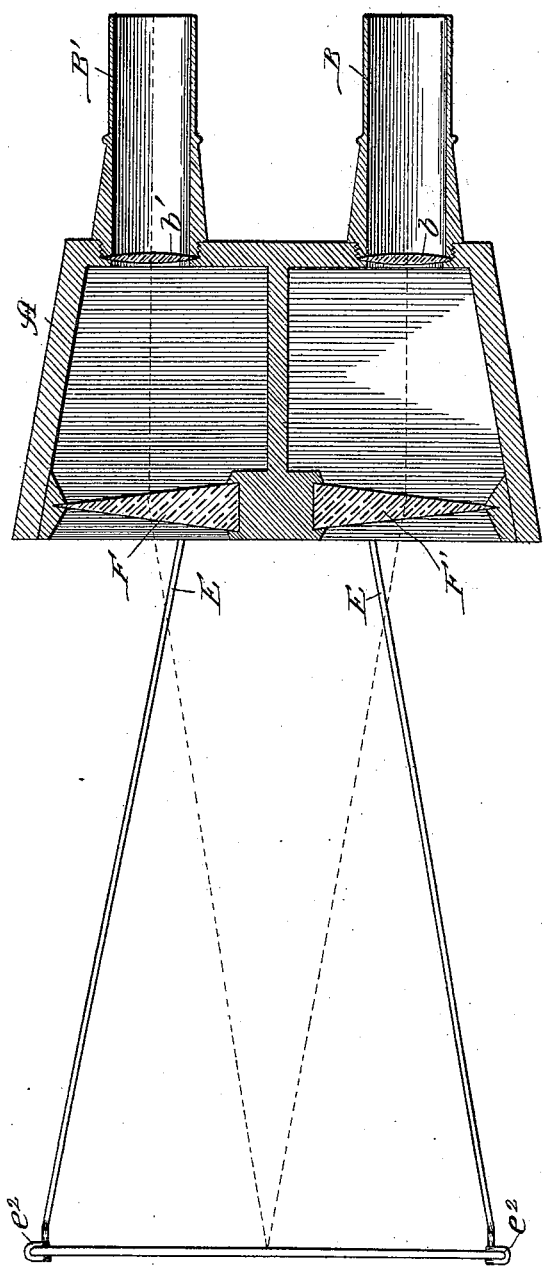

No. 607,171. Patented July 12, 1898.
H. H. HILL.
OPTICAL INSTRUMENT.
(Application filed June 7, 1897.)
(No Model.) 2 Sheets—Sheet 1.
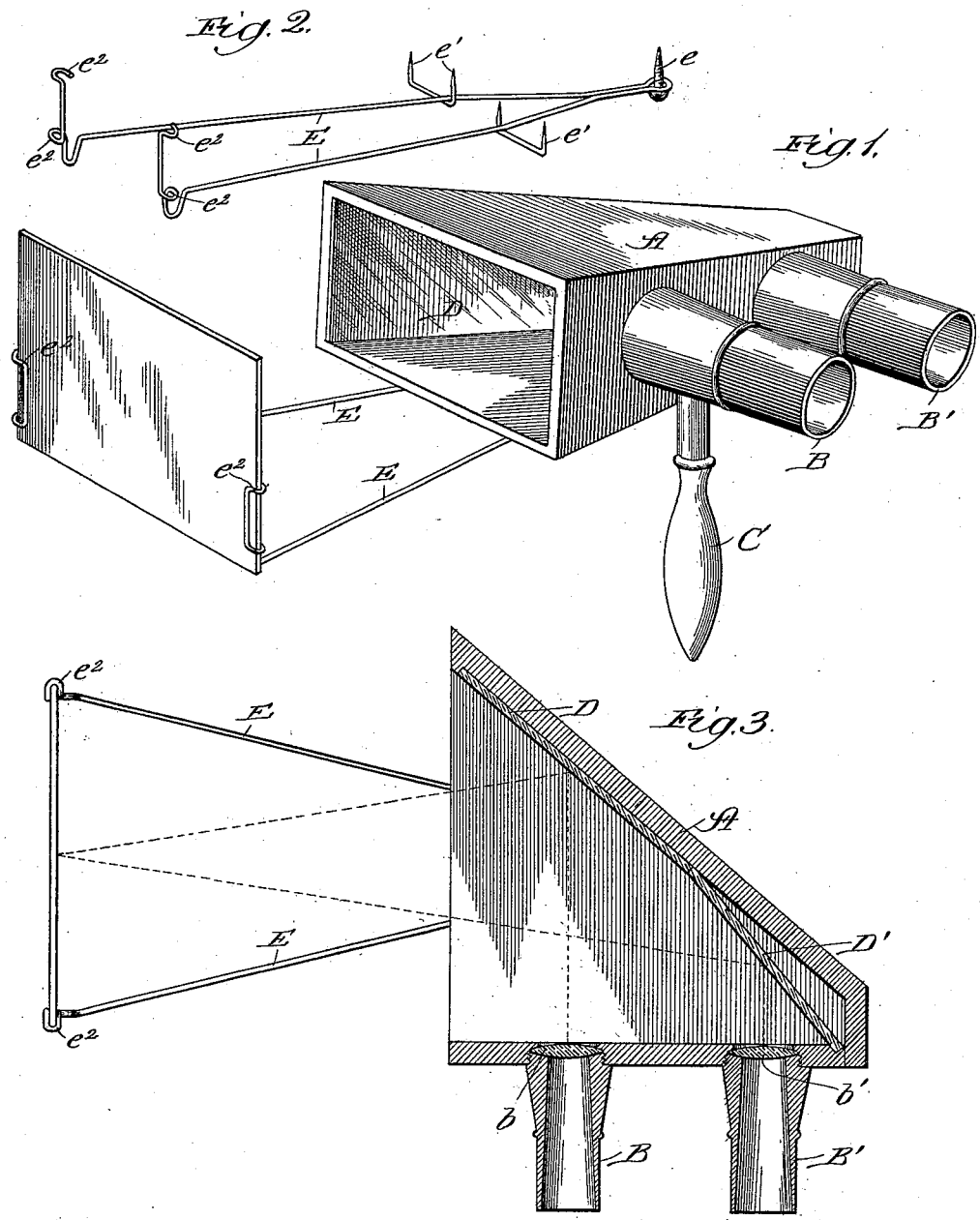

No. 607,171. H. H. HILL. Patented July 12, 1898.
OPTICAL INSTRUMENT.
(Application filed June 7, 1897.)

(No Model.) 2 Sheets—Sheet 2.

Witnesses:

Inventor:
Henry H. Hill,

UNITED STATES PATENT OFFICE.

HENRY H. HILL, OF CHICAGO, ILLINOIS.

OPTICAL INSTRUMENT.

SPECIFICATION forming part of Letters Patent No. 607,171, dated July 12, 1898.

Application filed June 7, 1897. Serial No. 639,674. (No model.)

*To all whom it may concern:*

Be it known that I, HENRY H. HILL, a citizen of the United States, residing at Chicago, Illinois, have invented certain new and useful Improvements in Optical Instruments, of which the following is a specification.

The object of my invention is to make a binocular optical instrument in which but one picture is needed instead of two, as in the ordinary stereoscope; and my invention consists in the features and details of construction hereinafter described and claimed.

In the drawings, Figure 1 is a perspective view of my improved optical instrument; Fig. 2, a perspective view of the picture-holding wires; Fig. 3, a sectional plan view taken through Fig. 1, and Fig. 4 a sectional plan view of a modified form of the instrument.

In making my improved optical instrument by which the perspective view is to be obtained by the use of a single picture instead of a double one, I make a case A, which may be of any desired material. This case is provided with two viewing-tubes B and B', arranged a proper distance apart to suit the eyes, which will usually be about two and a half inches. At the inner end of these viewing-tubes are arranged lenses $b$ and $b'$ of the ordinary construction. As shown in Figs. 1 and 3, these viewing-tubes are arranged at one side of the case of the instrument. The case should also be provided with a handle C to enable a user to easily hold it in position. Within the case, in the form shown in Figs. 1 and 3, I arrange two mirrors D and D', set at such angles as that the rays of light from the picture to be viewed will strike the mirrors and be reflected, respectively, through the lenses $b$ and $b'$ on parallel lines to the eyes of the beholder.

To support and hold the picture in place to be viewed, I arrange picture-holding wires E. These wires are preferably formed of a single piece of spring-wire attached to the case by a screw $e$ and passing through staples $e'$, which serve to hold them in proper position, while at the same time permitting the free ends of the wires to be sprung apart to accommodate pictures of different sizes. The free ends of the wires are bent into loops $e^2$, adapted to receive and embrace the ends of the card on which the picture is mounted. The rays of light from the center of the picture pass to the mirrors D and D', whence they are reflected through the lenses and to the eyes of the beholder, as represented by dotted lines in Fig. 3. This causes two images of the single picture to be produced in the mirrors and to be transmitted from the mirrors to the eyes of the beholder, so that the impression of a single perspective view is created.

In Fig. 4 I have arranged the viewing-tubes opposite the picture instead of at right angles to it, as in Figs. 1 and 3. Instead of mirrors I have arranged two refracting-prisms F and F' in front of the viewing-tubes, so that the rays of light from the picture to be viewed striking these prisms will be refracted and transmitted in parallel lines to the eyes of the beholder, as shown in dotted lines. In this way the same perspective impression is created as where the reflecting-mirrors are employed.

I do not specifically claim in this application the modification in which refracting-prisms are used, the same being the subject of a divisional application filed by me January 22, 1898, Serial No. 667,532.

What I regard as new, and desire to secure by Letters Patent, is—

1. In an optical instrument, the combination of a case, viewing-tubes, and means in the case for transmitting to the eyes of the beholder double images of a single picture.

2. In an optical instrument, the combination of a case, viewing-tubes, and reflecting-mirrors in the case for transmitting to the eyes of the beholder double images of a single picture.

3. In an optical instrument, two lenses and two mirrors, the mirrors being placed at angles to the lenses, respectively, for forming a double image from a single picture and thus creating a perspective impression on the beholder.

HENRY H. HILL.

Witnesses:
THOMAS A. BANNING,
THOMAS B. MCGREGOR.